United States Patent
Pandey et al.

(10) Patent No.: US 12,195,380 B2
(45) Date of Patent: Jan. 14, 2025

(54) PREFORM ASSEMBLY FOR DRAWING MULTICORE OR HOLEY OPTICAL FIBRE AND METHOD OF MANUFACTURING THEREOF

(71) Applicant: Sterlite Technologies Limited, Gurgaon (IN)

(72) Inventors: Anand Pandey, Gurgaon (IN); Ranjith Balakrishnan, Gurgaon (IN); Srinivas Reddy, Gurgaon (IN); Apeksha Malviya, Gurgaon (IN)

(73) Assignee: Sterlite Technologies Limited, Gurgaon (IN)

(*) Notice: Subject to any disclaimer, the term of this patent is extended or adjusted under 35 U.S.C. 154(b) by 109 days.

(21) Appl. No.: 17/485,495

(22) Filed: Sep. 26, 2021

(65) Prior Publication Data
US 2022/0315474 A1 Oct. 6, 2022

(51) Int. Cl.
C03B 37/012 (2006.01)
C03B 37/027 (2006.01)
G02B 6/02 (2006.01)

(52) U.S. Cl.
CPC .. C03B 37/02781 (2013.01); C03B 37/01208 (2013.01); C03B 37/0122 (2013.01); C03B 37/01222 (2013.01); C03B 37/01245 (2013.01); G02B 6/02328 (2013.01); G02B 6/02338 (2013.01); C03B 2203/16 (2013.01); C03B 2203/34 (2013.01); C03B 2203/42 (2013.01)

(58) Field of Classification Search
CPC ........................ C03B 37/01208; C03B 37/028
See application file for complete search history.

(56) References Cited

U.S. PATENT DOCUMENTS

| | | | |
|---|---|---|---|
| 6,418,258 B1* | 7/2002 | Wang | G02B 6/02376 385/124 |
| 2002/0118938 A1* | 8/2002 | Hasegawa | G02B 6/02328 65/435 |
| 2008/0276651 A1* | 11/2008 | Barish | C03B 37/01211 65/407 |
| 2012/0141079 A1* | 6/2012 | Gibson | C03B 37/0122 385/125 |
| 2014/0174134 A1* | 6/2014 | Fattal | C03B 37/01245 65/412 |
| 2016/0347645 A1* | 12/2016 | Gonda | C03B 37/025 |
| 2022/0011506 A1* | 1/2022 | Seifert | C03B 37/01211 |

FOREIGN PATENT DOCUMENTS

| | | | | |
|---|---|---|---|---|
| EP | 3115344 A1 * | 1/2017 | ....... | C03B 37/01222 |
| JP | 2005053756 A * | 3/2005 | ....... | C03B 37/01208 |

OTHER PUBLICATIONS

Imamura et al., "Investigation on multi-core fibers with large Aeff and low micro bending loss", Optics Express vol. 19, No. 11, May 2011, pp. 10595-10603. (Year: 2011).*
JP-2005053756-A Clarivate Machine Translation Retrieved Jun. 7, 2023. (Year: 2023).*

* cited by examiner

Primary Examiner — Lisa L Herring
(74) Attorney, Agent, or Firm — Steven R. Fairchild; Arun Kishore Narasani

(57) ABSTRACT

The present invention discloses a preform assembly and a method for drawing a multicore optical fibre and a holey fibre. Particularly, the preform assembly includes a hollow cylindrical tube, a plurality of discs stacked inside the hollow cylindrical tube and a plurality of core rods inserted in a plurality of through holes in each of the plurality of discs.

6 Claims, 9 Drawing Sheets

400C

400D

PREFORM ASSEMBLY FOR DRAWING MULTICORE OR HOLEY OPTICAL FIBRE AND METHOD OF MANUFACTURING THEREOF

CROSS-REFERENCE TO RELATED APPLICATIONS

This application claims the benefit of Indian Application No. 202111014806 titled "Preform Assembly For Drawing Multicore Or Holey Optical Fibre And Method Of Manufacturing Thereof" filed by the applicant on 31 Mar. 2021, which is incorporated herein by reference in its entirety.

FIELD OF THE INVENTION

Embodiments of the present invention relate to the field of optical fibers. And more particularly, relates to a preform assembly for drawing multicore or holey optical fibre and a method of manufacturing thereof.

DESCRIPTION OF THE RELATED ART

Over the years, the optical fibre cables have secured an important position in building optical networks of modern communication systems across the world. THe optical fibre cable consists of one or more optical fibres that use light to transfer information from one end of the one or more optical fibres to another. Due to the requirement of high capacity data rate, there is an extensive increase in usage of multicore optical fibres.

Conventionally, the multicore optical fibres are manufactured by drilling a long preform using a glass drilling process. Further, core rods are inserted in the long preform or the core rods are inserted into multi bore readymade silica tubes. The conventional process of manufacturing the multicore optical fibres using the glass drilling process involves a very precise drilling machine and tool. Hence, the glass drilling process is very costly for longer lengths of preforms.

Further, the conventional process has severe length restriction. Particularly, the length restriction limits scalability of the multicore optical fibres' large scale production. Even a small uneven pressure during drilling causes stress including cracks in the entire long preform. The possibility of the cracks is quite high while drilling at long preform depths with long drilling tools. Added to the cracks, achieving uniform pitch along the length in long drilled preforms will be a bigger challenge. In addition, the conventional process involves the stacking process for manufacturing of multicore optical fibres. The core rods are vertically stacked inside a cylinder along with pure silica glass rods and collapsed together. However, the conventional process of manufacturing of the multicore optical fibres using stacking process needs the core rods of different dimensions that increases the complexity of manufacturing the multicore fibre preform. Also, making the core rods of different dimensions are time consuming and costly. And, arranging the core rods inside the tube and collapsing is very complex and needs a lot of extra steps for manufacturing the multicore optical fibres.

Conventionally, the multicore optical fibres are manufactured by drilling multiple holes in a cylindrical glass preform and inserting the core rods in the holes. It is followed by drawing preform assembly to manufacture the multicore optical fibres.

U.S. Pat. No. 9,604,868B2 discloses a method to manufacture a multicore optical fibre where a glass preform with core rods is drawn. European Patent application EP0864544B1 discloses a process for assembling a glass preform for multicore fibre. ANd, Japanese Patent Application JP5835823B1 discloses a method for solving the problem of inaccuracy in core arrangement.

All the above prior art references refer to drilling holes in the glass preform followed by inserting the core rods in the drilled holes to prepare the preform assembly to draw the multicore optical fibres.

However, none of the prior art references suffer from one or more of the following limitations as it is an extremely complex process to drill holes in the glass preform of longer lengths such as 1-5 meters with a few microns tolerance. Hence, it becomes critical to maintain the accuracy of drilling, thereby increasing the complexity of the process and scrap, which in turn lead to increased cost, hampering wide scale adoption of the multicore optical fibres.

In light of the above-stated discussion, there is a need to develop a method of manufacturing multicore fibre from multicore performance assembly that overcomes the above cited drawbacks related to long length drilling in the glass preform.

SUMMARY OF THE INVENTION

An embodiment of the present invention relates to a preform assembly for drawing an optical fibre includes a hollow cylindrical tube and a plurality of discs stacked inside the hollow cylindrical tube and each of the plurality of discs has a plurality of through holes. And, the plurality of core rods inserted in the plurality of through holes of each of the plurality of discs.

In accordance with an embodiment of the present invention, the hollow cylindrical tube has a predefined tube length.

In accordance with an embodiment of the present invention, each of the plurality of discs has a predefined disc length. And, the predefined disc length is less than the predefined tube length.

In accordance with an embodiment of the present invention, each of a plurality of core rods has a predefined core rod length. And, the predefined disc length is equal to the predefined core rod length.

In accordance with an embodiment of the present invention, the hollow cylindrical tube has a plurality of concentric sub-glass tubes.

Another embodiment of the present invention relates to a method of manufacturing an optical fibre from a preform assembly. The method includes stacking a plurality of discs inside a hollow cylindrical tube, and each of the plurality of discs has a plurality of through holes and drawing the preform assembly to manufacture the optical fibre.

In accordance with an embodiment of the present invention, the method further comprises inserting a plurality of core rods in the plurality of through holes of each of the plurality of discs.

In accordance with an embodiment of the present invention, the method comprises drilling the plurality of through holes in each of the plurality of discs prior to stacking inside the hollow cylindrical tube.

In accordance with an embodiment of the present invention, the hollow cylindrical tube has a plurality of concentric sub-glass tubes.

In accordance with an embodiment of the present invention, the method includes collapsing and stretching the preform assembly prior to drawing the preform assembly.

In accordance with an embodiment of the present invention, the method includes collapsing of the preform assembly and maintaining vacuum pressure in between the hollow cylindrical tube and the plurality of discs. In particular, the positive pressure is maintained in the plurality of through holes.

Yet another embodiment relates to a preform assembly for drawing a holey fibre, the preform assembly comprising a hollow cylindrical tube, a plurality of discs stacked inside the hollow cylindrical tube, and each of the plurality of discs has a plurality of through holes, and a plurality of core rods inserted in the plurality of through holes of each of the plurality of discs.

In accordance with an embodiment of the present invention, the preform assembly draws the holey fibre by stacking a plurality of discs inside a hollow cylindrical tube, and each of the plurality of discs has a plurality of through holes and drawing the preform assembly to manufacture the holey optical fibre.

The foregoing objectives of the present invention are attained by employing a preform assembly for drawing multicore or holey optical fibre and method of manufacturing thereof.

BRIEF DESCRIPTION OF THE DRAWINGS

So that the manner in which the above recited features of the present invention is understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. The invention herein will be better understood from the following description with reference to the drawing, in which.

ELEMENT LIST

Figure 1:
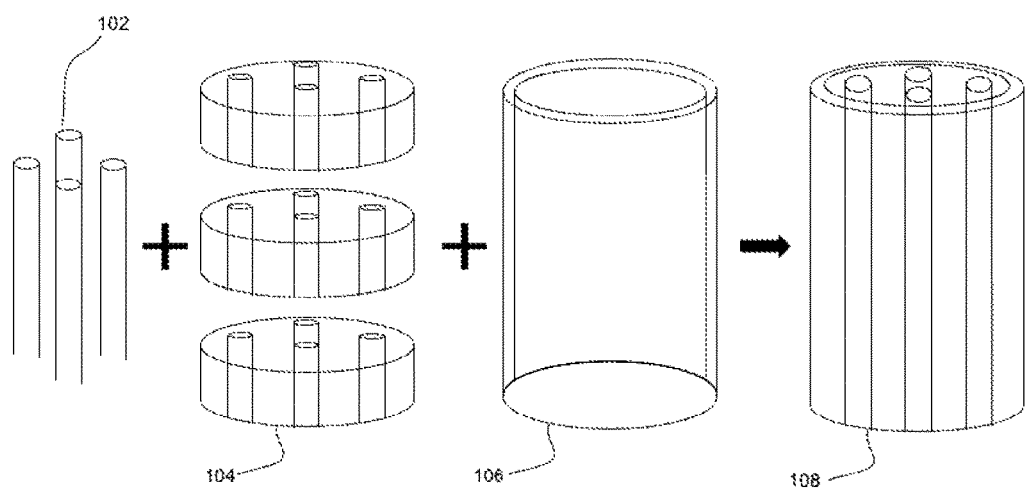
FIG. 1 is a pictorial representation illustrating an exploded view of a preform assembly in accordance with an embodiment of the present invention.

Perform Assembly 100
Plurality Of Core Rods 102
Plurality Of Discs 104
Hollow Cylindrical Tube 106
Stacked Assembly 108
Predefined Tube Length 110
Predefined Disc Length 112
Predefined Core Rod Length 114
Collapsing Assembly 300
Bottom Handle 302
Top Handle 304
Holding Tube 306
Spacer Plate 308
Silica Tube 401
Disc 402
Core Rod 403
First Gap 404
Plurality of Through Holes 405
Third Gap 406
Second Gap 407

The method and system are illustrated in the accompanying drawings, throughout which like reference letters indicate corresponding parts in the various figures.

It should be noted that the accompanying figure is intended to present illustrations of exemplary embodiments of the present disclosure. This figure is not intended to limit the scope of the present disclosure. It should also be noted that the accompanying figure is not necessarily drawn to scale.

DETAILED DESCRIPTION OF THE INVENTION

The present invention relates to a preform assembly for drawing multicore or holey optical fibre and method of manufacturing thereof.

The principles of the present invention and their advantages are best understood by referring to FIG. 1 to FIG. 6. In the following detailed description numerous specific details are set forth in order to provide a thorough understanding of the embodiment of invention as illustrative or exemplary embodiments of the disclosure, specific embodiments in which the disclosure may be practiced are described in sufficient detail to enable those skilled in the art to practice the disclosed embodiments. However, it will be obvious to a person skilled in the art that the embodiments of the invention may be practiced with or without these specific details. In other instances, well known methods, procedures and components have not been described in detail so as not to unnecessarily obscure aspects of the embodiments of the invention.

The following detailed description is, therefore, not to be taken in a limiting sense, and the scope of the present disclosure is defined by the appended claims and equivalents thereof. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. References within the specification to "one embodiment," "an embodiment," "embodiments," or "one or more embodiments" are intended to indicate that a particular feature, structure, or characteristic described in connection with the embodiment is included in at least one embodiment of the present disclosure.

Although the terms first, second, etc. may be used herein to describe various elements, these elements should not be limited by these terms. These terms are generally only used to distinguish one element from another and do not denote any order, ranking, quantity, or importance, but rather are used to distinguish one element from another. Further, the terms "a" and "an" herein do not denote a limitation of quantity, but rather denote the presence of at least one of the referenced items.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

FIG. 1 is a pictorial representation illustrating an exploded view of a preform assembly in accordance with an embodiment of the present invention. In particular, the preform assembly 100 may have a hollow cylindrical tube 106 and a plurality of discs 104 stacked inside the hollow cylindrical tube 106. And, each of the plurality of discs 104 may have more than one or a plurality of through holes, which may be circular in shape and may run longitudinally throughout the plurality of discs 104. In addition, each of the plurality of discs may have an extra hole if a marker rod has to be used in the multicore fibre preform.

In an exemplary example, the extra hole in each of the plurality of discs may be circular.

Alternatively, the extra hole in each of the plurality of discs may be rectangular.

Alternatively, the extra hole in each of the plurality of discs may have triangular or any other suitable non-circular shape. The triangular or circular or non-circular shaped hole may be used for the marker rod.

In accordance with an embodiment of the present invention, a holey fibre is made up of a single material and light guidance happens through a solid core through total internal reflection. Particularly, the air-holes in the same material lower an effective refractive index of the cladding part and result in confinement of light in the solid core part.

In case of the holey fibre, there is no use of a plurality of core rods, instead the plurality of discs 104 may be stacked vertically into the hollow cylindrical tube 106 to form a holey fibre preform assembly. Each of the plurality of discs 104 may include the plurality of through holes. And, the plurality of through holes may extend in longitudinal direction of the plurality of discs 104.

In an embodiment, the number of the plurality of through holes in each of the plurality of discs 104 may be 4 (as shown in FIG. 1).

Figure 2:
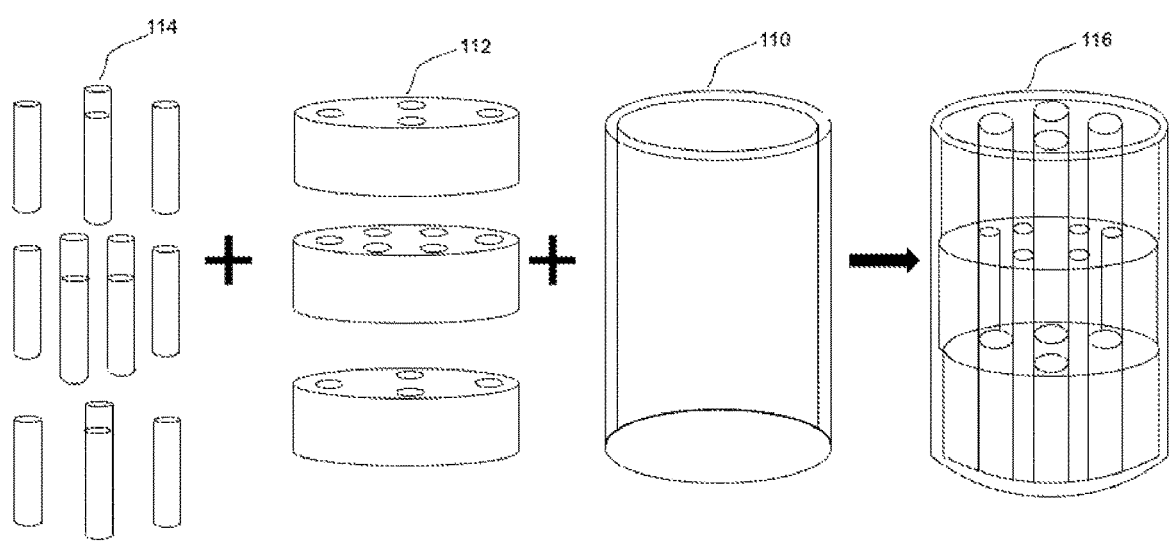
FIG. 2 is a pictorial representation illustrating another exploded view of a preform assembly in accordance with an embodiment of the present invention.

In another embodiment, the number of the plurality of through holes in each of the plurality of discs 112 may be 6 (as shown in FIG. 2).

Further, the plurality of through holes in each of the plurality of discs 104 may be equal to the plurality of core rods 102. And, number of the plurality of through holes in each of the plurality of discs 104 may vary depending upon variation in number of the plurality of core rods 102. The plurality of core rods 102 and the plurality of discs 104 may undergo etching and cleaning process. Furthermore, the plurality of core rods 102 and the plurality of discs 104 may undergo drying and purging.

The drying of the plurality of core rods 102 and the plurality of discs 104 is performed to remove moisture from the plurality of core rods 102 and the plurality of discs (drilled preforms) 104. The plurality of core rods 102 may be fitted in the plurality of through holes of each of the plurality of discs 104 to prepare the preform assembly 100 useful to manufacture the multicore optical fibre.

In addition, the marker rod (if it has to be used) is inserted in an extra hole present in each of the plurality of discs 104. The marker rod (if it has to be used) and the plurality of core rods 102 may have different refractive indexes (indices). The marker rod may be made up of up-dopant or down dopant impurities. It has different concentration than a plurality of cores in the multicore fibre. Refractive index of the marker rod may be slightly higher than that of a pure silica glass.

Alternatively, the refractive index of the marker rod may be slightly lower than that of the pure silica glass.

In particular, the marker rod may be used for identification of a core in the multicore fibre. Moreover, the marker rod eases alignment of the multicore fibre in the splicing process and connecting in a transmission link. Further, the multicore fibre may have the marker rod along with the plurality of cores. The marker rod may be either triangular, circular or of any shape and may be made up of up-dopant impurities (like germanium) and if marker rod is to be used in an optical fibre it is done by drilling a solid cylinder along with the drilling of the plurality of cores. The marker rod may have different concentration than the plurality of cores in the multicore fibre. Refractive index of the marker rod may be higher or less than the refractive index of the pure silica glass. The marker rod is very important in the multicore fibre for the identification of the plurality of cores. The marker rod eases the alignment of the multicore fibre in the splicing process and connecting in the transmission link.

Particularly, the hollow cylindrical tube 106 may have a predefined tube length 110, each of the plurality of discs 104 may have a predefined disc length 112, and each of a plurality of core rods 102 may have a predefined core rod length 114. The preform assembly 100 is shown to have the predefined disc length 112 and predefined marker rod length which are less than the predefined tube length 110, and the predefined core rod length 114 and predefined marker rod (if it is used) length are equal to the predefined disc length 110.

In other words, the plurality of discs 104 may be stacked inside the hollow cylindrical tube 106, and each of the plurality of core rods 102 may pass through one of the plurality of through holes in each of the plurality of disc 104. In other words, for one core rod there may be one hole in a disc. Each disc may have the same number of the plurality of through holes of the same size at the same location. Alternatively, each of the plurality of discs 104 may have a different number of the plurality of through holes of same size but at different locations. The hollow cylindrical tube 106 and the plurality of discs 104 may be made of composition suitable for cladding of the multicore optical fibre.

For example, the hollow cylindrical tube 106 and the plurality of discs 104 may be made of silica glass.

In another example, a first glass sub-tube and a second glass sub-tube may be arranged concentrically to form the hollow cylindrical tube 106 which is a multicore preform assembly.

The first glass sub-tube may be a silica glass while the second glass sub-tube, i.e., an inner second glass sub-tube, may be fluorine or chlorine doped silica glass tube. Particularly, the plurality of discs 104 stacked inside the hollow cylindrical tube 106 may be made of silica glass.

In this example, the perform assembly 100 may be used to manufacture a trench assisted multi core optical fibre. The plurality of core rods 102 may be made of up-dopant pure silica such as germanium doped silica glass. Alternatively, the plurality of core rods 102 may be made of up-dopant pure silica glass surrounded by down doped regions. It is understood to a person ordinarily skilled in the art that the composition of the hollow cylindrical tube 106, the plurality of discs 104 and the plurality of core rods 102 do not limit the scope of the disclosure. The preform assembly 100 is assembled such that to minimize air gaps in the preform assembly 100.

FIG. 2 is a pictorial representation illustrating another exploded view of a preform assembly in accordance with an embodiment of the present invention. In particular, the predefined disc length 112 less than the predefined tube length 110, and the predefined core rod length 114 equal to the predefined disc length 112. In other words, the plurality of discs may be stacked inside the hollow cylindrical tube 106, and each disc may have one core rod in each of the plurality of through holes. Moreover, each disc may have the same number of the plurality of through holes of the same size at the same location. Alternatively, each disc may have a different number of the plurality of through holes of the same size in different locations.

Figure 3:
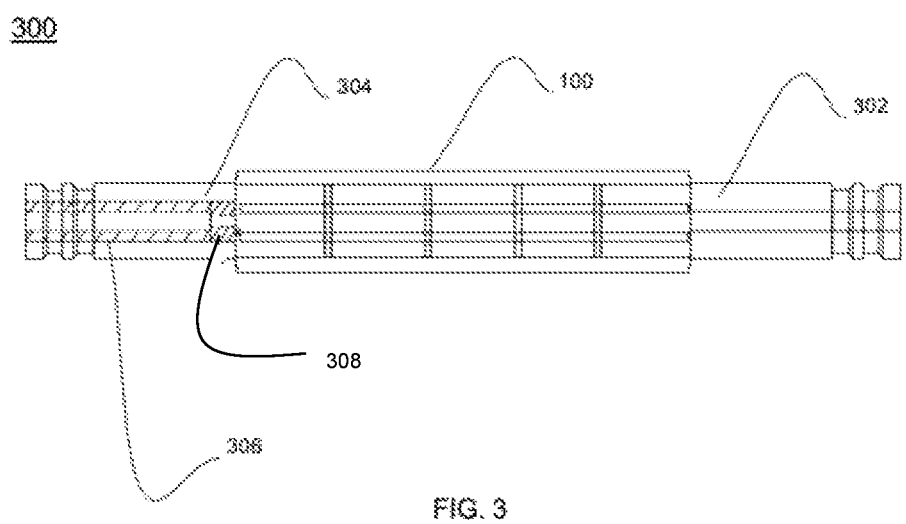
FIG. 3 illustrates a collapsing assembly with the preform assembly held by a top handle and a bottom handle in accordance with an embodiment of the present invention.

FIG. 3 illustrates a collapsing assembly with the preform assembly held by a top handle and a bottom handle in accordance with an embodiment of the present invention. In particular, the stacked assembly before collapsing 300 having the preform assembly 100 is held by a top handle 304 and a bottom handle 302. Moreover, the top handle 304 may be welded onto the hollow cylindrical tube 106. Further, the top handle 304 may have a holding tube 306 and a spacer plate 308. The top handle may be hollow. Subsequently, the top handle 304 may be welded with a top portion of a stacked assembly 108 (i.e., the plurality of core rods 102, the plurality of discs 104 and the hollow cylindrical tube 106). And, each of the plurality of discs 104 may be inserted into the hollow cylindrical tube 106 through the top handle 304 followed by insertion of the plurality of core rods 102 facilitated through the top handle 304 through the plurality of through holes present in each of the plurality of discs 104.

In addition, the spacer plate 308 is installed over the stacked assembly 108. Particularly, the spacer plate 308 is utilized to prevent the plurality of discs 104 along with the plurality of core rods 102 to come out of the stacked assembly 108. Moreover, the spacer plate 308 may have an outer diameter in a range of 1 millimetre to 5 millimetres less than an inner diameter of the top handle 304 to facilitate passage for sucking out air between the plurality of core rods 102 and the plurality of discs 104 while collapsing. Further, the outer diameter of the spacer plate 308 may vary. The spacer plate 308 may have one or more grooves. The one or more grooves act as a passage for air to come out of the stacked assembly 108 when vacuum is applied. Number of the grooves in the spacer plate may vary. The spacer plate 308 may have a length in longitudinal direction in range of 25 millimetres to 200 millimetres. Length of the spacer plate 308 may vary. The spacer plate 308 is pressed against the stacked assembly 108 with facilitation of the holding tube 306.

In particular, the holding tube 306 may have an outer diameter of about 1 millimetre to 5 millimetres less than the inner diameter of the first handle 304. And, the outer diameter of the holding tube 306 may vary. Moreover, the holding tube 306 may have thickness in a range of 10 millimetres to 100 millimetres or may be solid with one or more grooves. Thickness of the holding tube 306 may vary. Length of the holding tube 306 and the spacer plate 308 altogether may be equal to length of the top handle 304.

The collapsing assembly 300 may include the bottom handle 302. The bottom handle may be welded with a bottom portion of the stacked assembly 108. In an example, the bottom handle 302 may be the solid cylinder or cylinder with a small hole whose size may vary from 5 millimetre to 50 millimetre.

Particularly, the collapsing assembly 300 is used either for collapsing or collapsing and stretching of the preform assembly 100. Collapsing is a process in which the preform assembly is heated above a softening temperature and at this temperature, under the application of vacuum pressure, the different components of the assembly fuse together to form a single component. During this fusion, there may be a tensile force applied on the preform assembly to stretch the preform in the collapsing assembly 300 in an axial direction. The stretching process is done to achieve a required final diameter of the component formed. The preform assembly 100 may collapse the temperature in the range of 1700° C. to 2300° C.

Figure 4A:
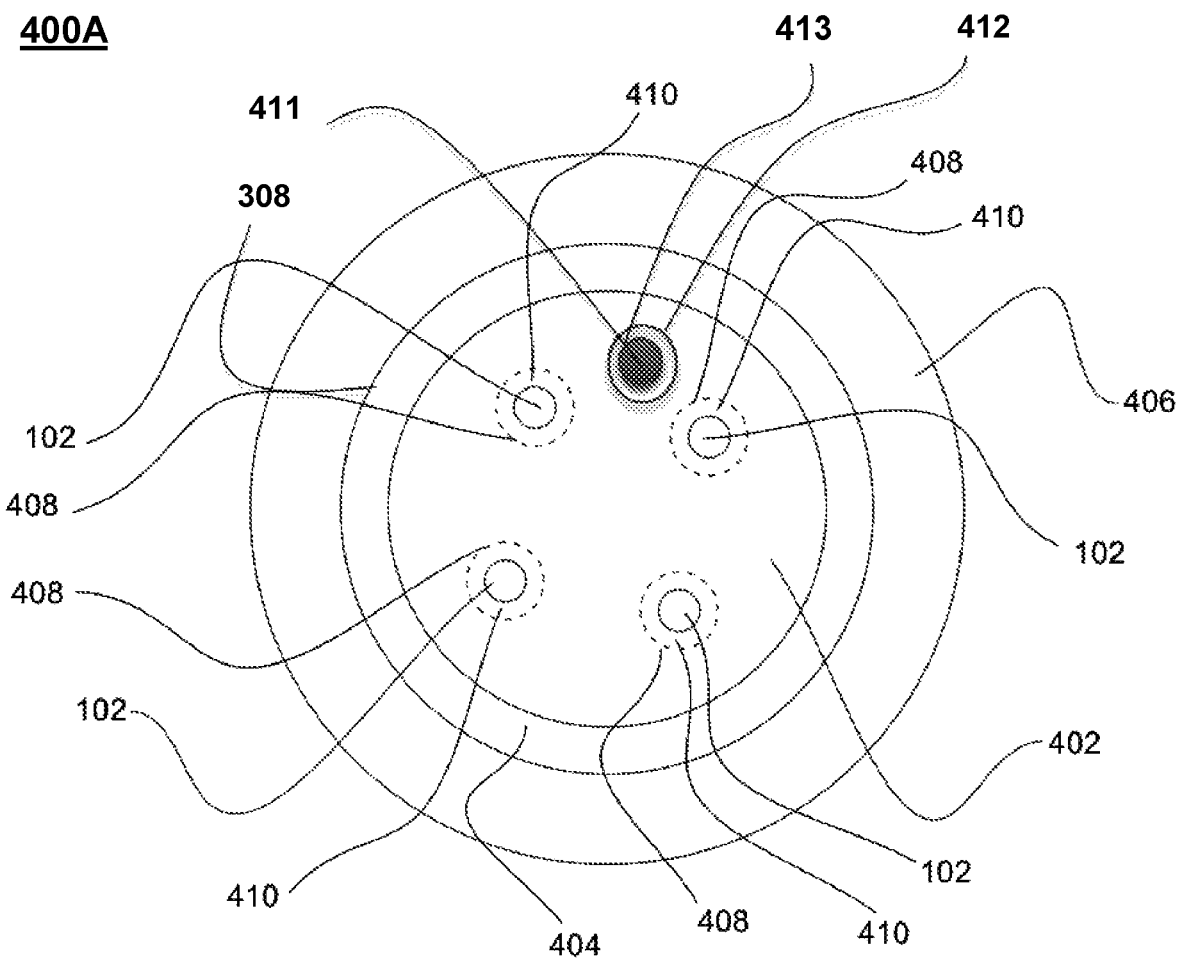
FIG. 4A is a pictorial representation illustrating a cross-sectional view of a single tube multicore preform assembly having marker rod in accordance with an embodiment of the present invention.
Figure 4B:
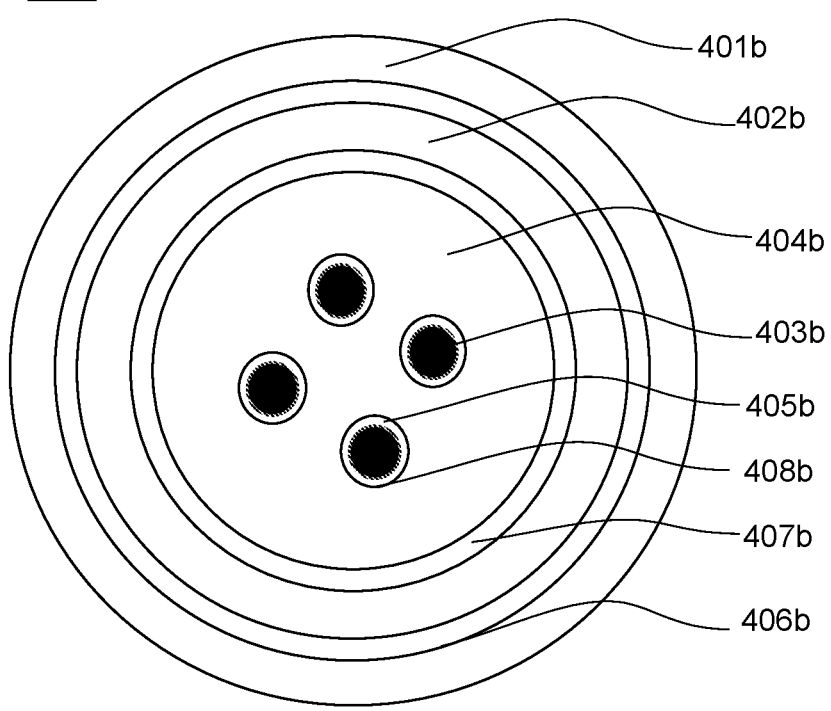
FIG. 4B is a pictorial representation illustrating cross-sectional view the multicore preform assembly having an inner and outer tube in accordance with an embodiment of the present invention.

FIG. 4A is a pictorial representation illustrating a cross-sectional view of a single tube multicore preform assembly having marker rod in accordance with an embodiment of the present invention. The cross-sectional view 400a shows a four (04) core multicore fibre having a single tube without the marker rod. Alternatively, the number of tubes may vary as shown in FIG. 4b. Also, the number of drilled portions for plurality of core rods may vary. The number of drilled circular portions is the same in number as the plurality of core rods. The four core multicore fibre is manufactured by inserting the disc of the plurality of discs 104 in the hollow cylindrical tube 106 followed by insertion of the plurality of core rods 102 from through the plurality of through holes into the disc stacked in the hollow cylindrical tube 106.

In particular, there are four (04) cores in the hollow cylindrical tube 406 having presence of the marker rod (411). Moreover, the plurality of through holes 408 in the disc 402 are four for four core rods 102, having a first gap 404 between a silica tube and the disc along with a second gap 410 between the plurality of core rods 102 and the plurality of through holes 408, a third gap (413) between drilled circular portion (412) and marker rod (412). In addition, this stacked assembly undergoes either collapsing alone or collapsing and stretching followed by forming of cone at one end of the preform to facilitate ease in process of drawing of multicore fibre from the preform assembly i.e., multicore fibre preform assembly. The collapsing temperature of the preform assembly is 1700° C. to 2300° C.

FIG. 4B is a pictorial representation illustrating a cross-sectional view the multicore preform assembly having an inner and outer tube in accordance with an embodiment of the present invention. The cross-sectional view 400b is shown to include four (04) cores having a double tube without the marker rod. And, there are four (04) drilled holes, i.e., the plurality of through holes 405(b) for four core rods 403(b) in the disc 404(b). Alternatively, the number of drilled holes may vary as per the plurality of core rods. There is an internal tube 402(b) which is either a fluorine doped or chlorine doped and an outer pure silica tube 401(b). There is a first gap 408(b) between the plurality of core rods 403(b) and the plurality of through holes (i.e., drilled circular holes) 405(b) in the disc 404(b), a second gap 407(b) between the disc 404(b) and an inner fluorine or chlorine doped tube 402(b) and a third gap 406(b) between the outer pure silica tube 401(b) and the inner fluorine or chlorine doped tube 402(b).

Figure 4C:
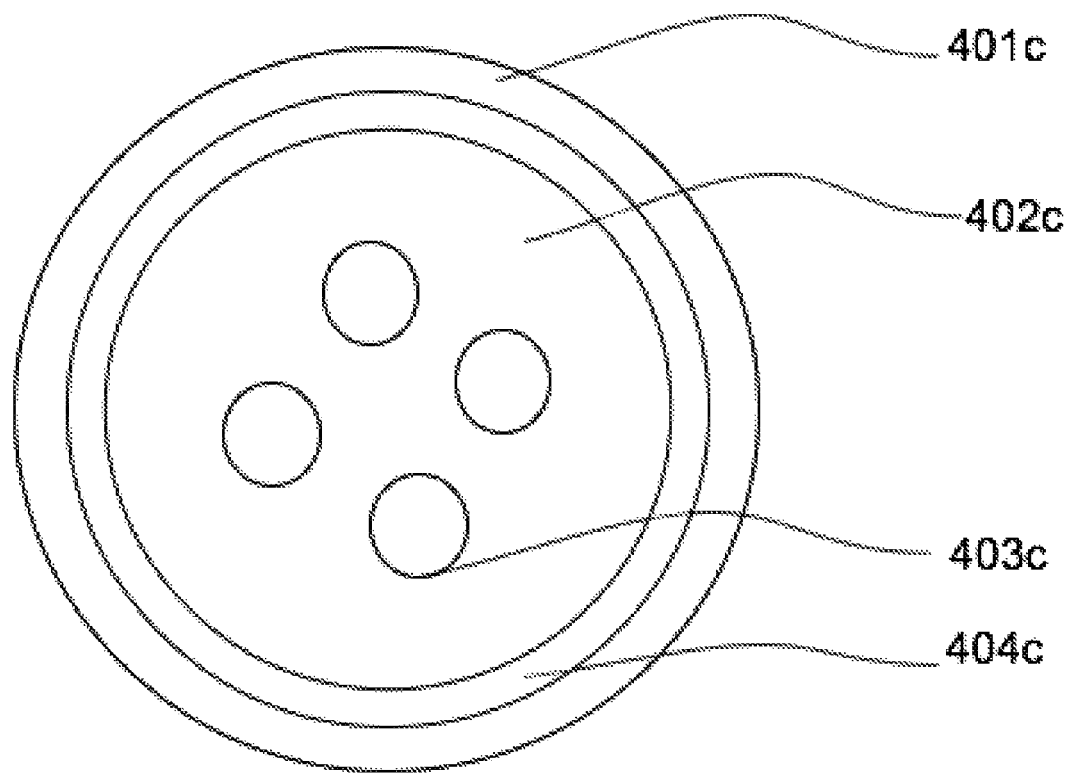
FIG. 4C is a pictorial representation illustrating a cross-sectional view of a holey fibre preform assembly in accordance with an embodiment of the present invention.

FIG. 4C is a pictorial representation illustrating a cross-sectional view of a holey fibre preform assembly in accordance with an embodiment of the present invention. Particularly, the holey fibre may have a single tube preform assembly 100. Alternatively, the number of tubes outside the plurality of discs may vary.

In particular, there are four (04) holes 403(c) drilled in the disc 402(c) having a first gap 404(c) between a disc 402(c) and a silica tube 401(c). Alternatively, the number of drilled circular portions in the disc may vary. There is no insertion of the plurality of core rods or marker rod(s). The marker rod(s) is not required in the holey fibre because light is guided through the centre and it does not require the plurality of cores as it is there in multicore preform assembly.

Figure 4D:
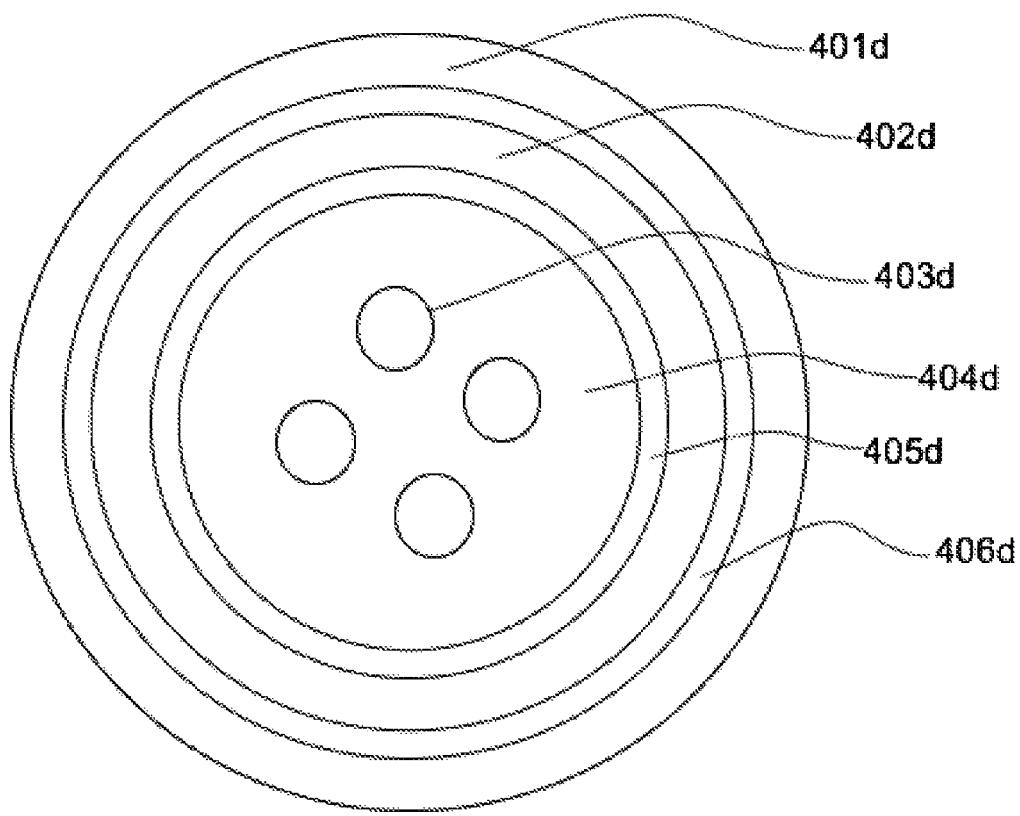
FIG. 4D is a pictorial representation illustrating a cross-sectional view of the holey fibre preform assembly having an outer and inner tube in accordance with an embodiment of the present invention.

FIG. 4D is a pictorial representation illustrating a cross-sectional view of the holey fibre preform assembly having an outer and inner tube in accordance with an embodiment of the present invention. Particularly, the holey fibre has a single tube and an inner and outer tube respectively. And, the holey fibre is manufactured by drilling of holes into each of the plurality of discs 104 followed by collapsing at the temperature of 1700-2300° C. Moreover, the collapsing of the holey fibre preform assembly is done by maintaining a vacuum pressure between the hollow cylindrical tube 106 and the plurality of discs (drilled discs) 104 and by maintaining positive pressures in the plurality of through holes to avoid collapsing of the plurality of through holes. In addition, a cone is formed at one end of the holey fibre preform so as to facilitate ease in process for drawing of the holey fibre from a draw tower from the holey fibre preform assembly. During drawing also, the positive pressure may be maintained in the plurality of through holes using an inert gas to avoid collapsing of the plurality of through holes.

In particular, there are four (04) drilling portions 403(d) into a disc 404(d) and there are two tubes out of which one is an outer silica tube 401(d) and another is an inner silica tube 402(d). Alternatively, the number of drilling portions in a holey fibre may vary. A first gap 405(d) is formed between the disc 404(d) and an inner fluorine or chlorine doped tube 402(d) and a second gap 406(d) is formed between the inner fluorine or chlorine doped tube 402(d) and the outer pure silica tube 401(d).

Figure 4E:
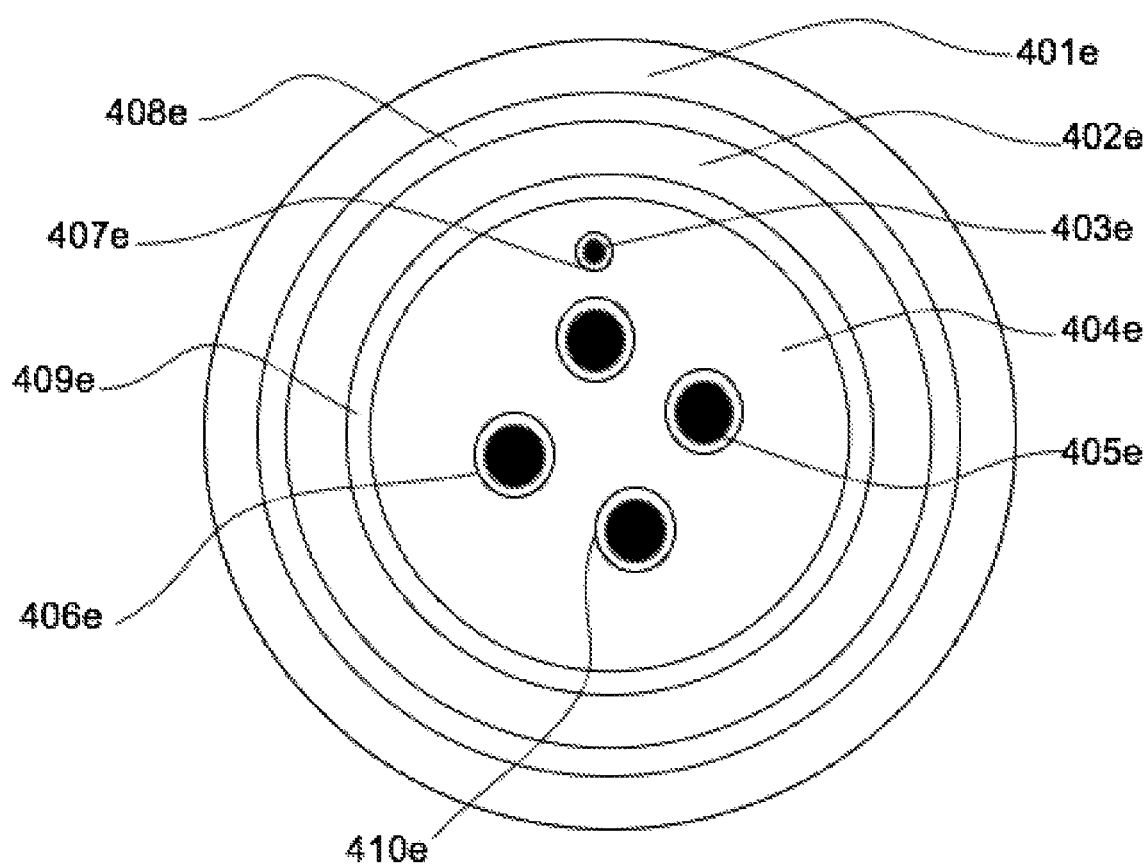
FIG. 4E is a pictorial representation illustrating another cross-sectional view of the multicore preform assembly with an inner and outer tube and a marker rod in accordance with an embodiment of the present invention.

FIG. 4E is a pictorial representation illustrating another cross-sectional view of the multicore preform assembly with an inner and outer tube and a marker rod in accordance with an embodiment of the present invention. This is manufactured through stacking each of the plurality of discs 104 into the hollow cylindrical tube 106 followed by insertion of the plurality of core rods 102 into the plurality of through holes (drilled circular holes) in stacked disc in the hollow cylindrical tube 106. In particular, one core rod is inserted in one of the plurality of through holes while the marker rod is inserted into the extra hole drilled in the disc 404e. And, the preform assembly undergoes for either collapsing or collapsing and stretching followed by forming of cone at one end of the preform and drawing of the multicore fibre from the multicore fibre preform assembly.

Further, the multicore preform assembly which has four (04) plurality of through holes (drilled circular holes) 406(e) in the disc 404(e) for four core rods 405(e) and an extra hole (drilled hole) 407(e) for the marker rod 403(e). Alternatively, the number of drilled circular portions may vary as per the plurality of core rods. In a multicore preform assembly, the number of circular drilled portions is equal to the plurality of core rods. There is an inner tube 402(e) which is either a fluorine or chlorine doped tube and an outer tube of pure silica 401(e). Length of each of the plurality of discs, length of plurality of core rods and length of the marker rod are the same. Length of each of the plurality of discs is less than the hollow cylindrical tube length.

The hollow cylindrical tube with a plurality of concentric sub glass tubes 400(e) includes the disc 404(e), a first gap 408(e), a pure silica tube 401(e), a drilled portion 406(e), a second gap 409(e), a chlorine or fluorine doped tube 402(e), a third gap 410(e) between the drilled portion 406(e) and the plurality of core rods 405(e) (similar to the plurality of core rods 102 from FIG. 1). The disc 404(e) corresponds to a preform of the plurality of discs 104 and may have a diameter of 132 millimetres. In addition, the diameter of the disc (drilled preform) 404(e) may vary.

Further, the hollow cylindrical tube 106 with the plurality of concentric sub glass tubes 400(e) may include the pure silica tube 401(e) and the chlorine or fluorine doped tube 402(e). The pure silica tube 401(e) may have an outer diameter and the chlorine or fluorine doped tube 402(e) may have an inner diameter. The outer diameter of the pure silica tube 401(e) may be 150 millimetres. In addition, the outer diameter of the pure silica tube 401(e) may vary. The inner diameter of the chlorine or fluorine doped tube 402(e) may be 135 millimetres. Further, the inner diameter of the chlorine or fluorine doped tube 402(e) may vary. Furthermore, the chlorine or fluorine doped tube 402(e) may have a thickness of 7.5 millimetres. The thickness of the chlorine or fluorine doped tube 402(e) may vary. The chlorine or fluorine doped tube 402(e) may surround the disc (i.e., drilled preform) 404(e).

The hollow cylindrical tube 106 with the plurality of concentric sub glass tubes 400(e) includes the first gap 408(e) between the pure silica tube 401(e) and the chlorine or fluorine doped tube 402(e) a second gap 409(e) between the disc 404(e) and the chlorine or fluorine dope tube 402(e) may be in a range of 3+/−2 millimetres. Also, the second gap 409(e) between the fluorine or chlorine doped tube 402(e) and the disc 404(e) may vary.

Further, the disc 404(e) has the drilled portion 406(e) corresponding to the plurality of through holes. In addition, the drilled portion 406(e) may have a diameter of 22 millimetres. Alternatively, the diameter of the drilled portion 406(e) may vary. Number of the drilled portion 406(e) is 4 and the number of the drilled portion 406(e) may vary depending upon the number of the plurality of core rods 102. Particularly, the disc (drilled preform) 404(e) may include the plurality of core rods 102

Further, the third gap 410(e) is present between the drilled portion 406(e) and the plurality of core rods 405(e). And, the third gap 410(e) between the drilled portion 406(e) and the plurality of core rods 405(e) may be in a range of 3+/−2 millimetres. Moreover, the third gap 410(e) between the drilled portion 406(e) and the plurality of core rods 405(e) may vary.

The hollow cylindrical tube 106 with the plurality of concentric sub glass tubes having single cladding 400(e) may include the drilled hole 407(e) for the marker rod 403(e). Alternatively, there may not be the drilled hole 407(e) for the marker rod 403(e) in the multicore fibre preform as illustrated in FIG. 4(b). There exists a gap between the drilled hole 407(e) for the marker rod 403(e) and the marker rod 403(e). The marker rod may have a triangular shape. In addition, the marker rod 403(e) may have circular shape. The marker rod may have any other suitable shape. The marker rod may be made of up-dopant or down dopant impurities. The up-dopant impurities include but not be limited to germanium. The marker rod 403(e) is used in the multicore fibre for identification of the plurality of cores. The marker rod 403(e) may have different concentration than the plurality of core rods 405(e) in the multicore fibre. The marker rod 403(e) eases alignment of the multicore fibres in the splicing process and connects the transmission link. The marker rod 403(e) may have the refractive index higher than the refractive index of the pure silica glass. In addition, the marker rod 403(e) may have a refractive index less than the refractive index of pure silica glass.

Figure 5:
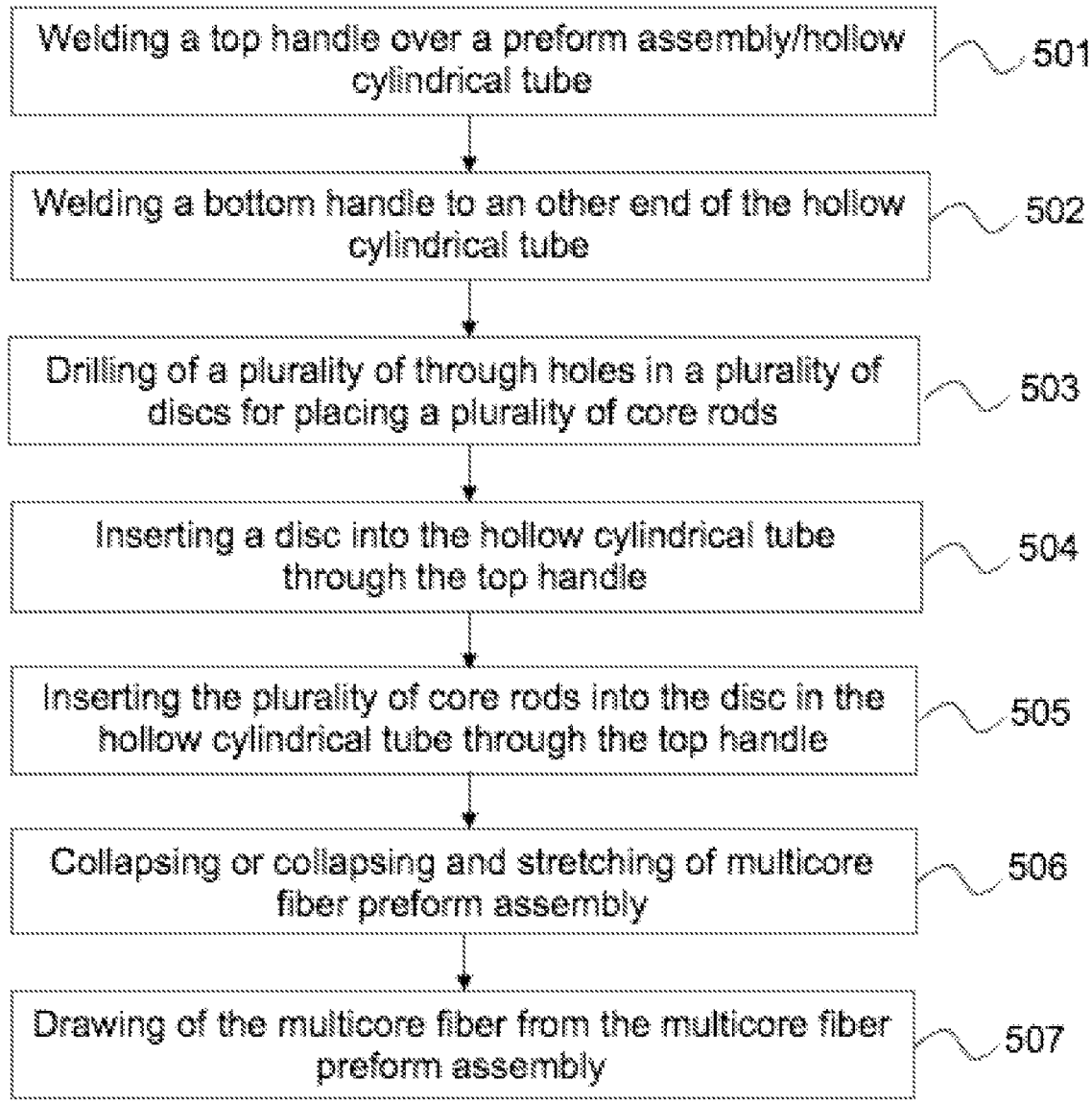
FIG. 5 is a flowchart illustrating a method of manufacturing an optical fibre from the preform assembly in accordance with an embodiment of the present invention.

FIG. 5 is a flowchart illustrating a method of manufacturing an optical fibre from the preform assembly in accordance with an embodiment of the present invention. The method 500 starts at step 501 and proceeds to step 502, 503, 504, 505, 506 and 507.

At step 501, top handle 304 is welded over the hollow cylindrical tube 106 and/or the preform assembly (i.e., multicore preform assembly) 100. In particular, the top handle may be a hollow cylindrical tube for placing the spacer plate 308 and the holding tube 306 inside it. Moreover, the holding tube facilitates holding of the stacked preform assembly.

At step 502, the bottom handle 302 is welded at the other end of the hollow cylindrical tube 106.

At step 503, the plurality of through holes are welded for the plurality of cores to be inserted into each of the plurality of discs 104.

At step 504, the disc of the plurality of discs 104 are inserted into the hollow cylindrical tube 106 through the top handle 304.

At step 505, the plurality of core rods 102 are inserted into the disc in the hollow cylindrical tube through the top handle.

At step 506, the preform assembly is either collapsed or collapsed and stretched. In particular, the preform assembly is collapsed at the temperature of 1700-2300° C.

At step 507, the multicore fibre is drawn from the multicore fibre preform assembly.

Figure 6:
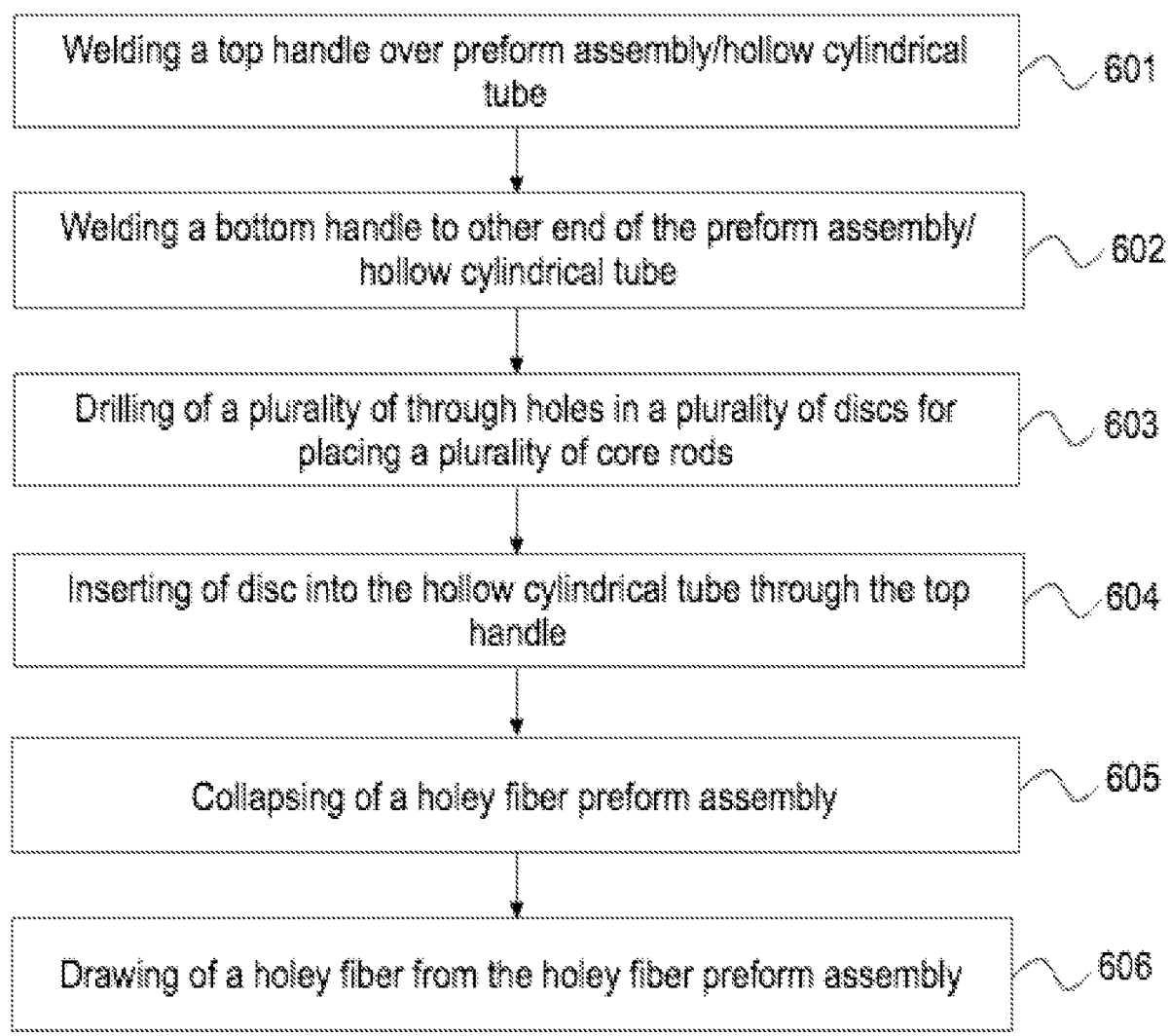
FIG. 6 is a flowchart illustrating another method of manufacturing a holey optical fibre from the preform assembly in accordance with an embodiment of the present invention.

FIG. 6 is a flowchart illustrating another method of manufacturing a holey optical fibre from the preform assembly in accordance with an embodiment of the present invention. The method 600 starts at step 601 and proceeds to step 602, 603, 604, 605 and 606.

At step 601, the top handle 304 is welded over the hollow cylindrical tube 106 and/or the preform assembly (i.e., holey preform assembly). Particularly, the top handle may be a hollow handle that includes the spacer plate 308 and the holding tube 306 inside it.

At step 602, the bottom handle 302 is welded at other end of the hollow cylindrical tube 106 and/or the preform assembly (i.e., holey preform assembly).

At step 603, the method includes drilling of the plurality of through holes into each of the plurality of discs 104 for inserting the plurality of core rods 102.

At step 604, each of the plurality of discs 104 are inserted into the hollow cylindrical tube (106) through the top handle.

At step 605, the holey fibre preform assembly collapses. This collapsing of the holey fibre preform assembly is done by maintaining a vacuum pressure between the hollow cylindrical tube and the plurality of discs and by maintaining positive pressures in the plurality of through holes to avoid collapsing of the plurality of through holes. The preform assembly is collapsing at the temperature of 1700-2300° C.

At step 606, the holey fibre is from the holey fibre preform assembly. During drawing also, a positive pressure is maintained in the plurality of through holes using an inert gas to avoid collapsing of the plurality of holes. In particular, the plurality of discs 104 is stacked inside the hollow cylindrical tube 106. Moreover, each disc has the plurality of through holes. Thereafter, the preform assembly 100 is drawn to manufacture the holey optical fibre. Alternatively, the plurality of core rods 102 is inserted in the plurality of through holes of each of the plurality of discs 104, the preform assembly 100 is then drawn to manufacture the multicore optical fibre and the holey fibre.

Prior to stacking the plurality of discs 104 inside the hollow cylindrical tube 106, an inner glass preform or silica based plurality of discs 104 are drilled in circular for inserting of plurality of core rods 102 (In case marker rod is to be used, an extra hole has to be drilled in the silica discs for inserting marker rod in each of the disc of plurality of discs). The preform assembly 100 can either be collapsed or collapsed and stretched prior to drawing the preform assembly 100 into an optical fibre (multicore, holey). Prior to drawing of the multicore or holey fibre from preform assembly, cones have to be formed at one end of the preform assembly to ease the process of drawing fibre.

It may be noted that the method 500 and 600 is explained to have above stated process steps, however, those skilled in the art would appreciate that the flowchart 900 may have more/less number of process steps which may enable all the above stated embodiments of the present disclosure.

The present invention of the method preform assembly (100) for drawing an optical fibre provides advantages such as a scalable and economically cheap method for manufacturing the multicore optical fibre from the multicore preform assembly.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the disclosure have been described above and illustrated in some cases, it should be interpreted and understood as to have been presented only by way of illustration and example, but not by limitation. Thus, the breadth and scope of a preferred embodiment should not be limited by any of the above-described exemplary embodiments.

It will be apparent to those skilled in the art that other embodiments of the invention will be apparent to those skilled in the art from consideration of the specification and practice of the invention. While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope of the invention. It is intended that the specification and examples be considered as exemplary, with the true scope of the invention being indicated by the claims.

It is to be understood that the terms so used are interchangeable under appropriate circumstances and embodiments of the invention are capable of operating according to the present invention in other sequences, or in orientations different from the one(s) described or illustrated above.

What is claimed is:

1. A preform assembly for drawing an optical fibre comprising:
   a hollow cylindrical tube;
   a plurality of discs stacked inside the hollow cylindrical tube (106), and each of the plurality of discs has a plurality of through holes; wherein at least one of the plurality of discs has an unequal number of through holes compared to another one of the plurality of discs; and
   a plurality of core rods inserted in the plurality of through holes of each of the plurality of discs.

2. The preform assembly as claimed in claim 1, wherein the hollow cylindrical tube has a predefined tube length.

3. The preform assembly as claimed in claim 2, wherein each of the plurality of discs has a predefined disc length, and each predefined disc length is less than the predefined tube length.

4. The preform assembly as claimed in claim 3, wherein each of the plurality of core rods has a predefined core rod length, and each predefined disc length is equal to each predefined core rod length.

5. The preform assembly as claimed in claim 1, wherein the hollow cylindrical tube has a plurality of concentric sub-glass tubes.

6. The preform assembly as claimed in claim 1 being used to draw an optical fibre, wherein the optical fibre is a multicore optical fibre.

* * * * *